United States Patent
Sato et al.

[11] Patent Number: 6,122,974
[45] Date of Patent: Sep. 26, 2000

[54] SEMICONDUCTOR TYPE PRESSURE SENSOR

[75] Inventors: Shinya Sato, Sendai; Seikou Suzuki, Hitachiohta; Shinichi Yamaguchi, Hitachinaka; Yoshiyuki Sasada, Hitachinaka; Masayuki Miki, Hitachinaka; Masanori Kubota, Hitachinaka; Atsushi Miyazaki, Mito, all of Japan

[73] Assignees: Hitachi, Ltd., Tokyo; Hitachi Car Engineering Co., Ltd., Ibaraki-ken, Japan

[21] Appl. No.: 09/139,273

[22] Filed: Aug. 25, 1998

[30] Foreign Application Priority Data

Aug. 25, 1997 [JP] Japan .................................. 9-227751

[51] Int. Cl.[7] .................................. G01L 9/00; G01L 7/08
[52] U.S. Cl. .................................. 73/754; 73/715
[58] Field of Search .................................. 73/754, 756, 753, 73/726, 727, 720, 721, 715, 716; 428/138, 195, 210

[56] References Cited

U.S. PATENT DOCUMENTS

| | | | |
|---|---|---|---|
| 4,314,225 | 2/1982 | Tominaga et al. | 338/4 |
| 4,780,572 | 10/1988 | Kondo et al. | 174/52 |
| 4,838,089 | 6/1989 | Okada et al. | 73/727 |
| 4,993,265 | 2/1991 | Koen et al. | 73/706 |
| 5,101,665 | 4/1992 | Mizuno | 73/721 |
| 5,511,428 | 4/1996 | Goldberg et al. | 73/777 |

*Primary Examiner*—Benjamin R. Fuller
*Assistant Examiner*—Abdullahi Aw-Musse
*Attorney, Agent, or Firm*—Evenson, McKeown, Edwards & Lenahan, P.L.L.C.

[57] ABSTRACT

A pressure sensor superior in pressure resistance and capable of covering from a low to high pressure range as a measuring range is to be provided. Plural pressure sensing sections for high and low pressures are formed on a silicon board, the pressure sensing sections each com ing an outer frame portion, a diaphragm portion, a strain gauge portion and an electrode portion. The silicon board side with the strain gauge portions formed thereon and an insulating substrate having electrode take-out portions are bonded together in such a manner that the strain gauge portions are hermetically sealed and that the electrode portions on the silicon board and the electrode take-out portions of the insulating substrate are electrically connected with each other, to constitute a pressure sensing unit. The pressure sensing unit, a low-melting glass and a stem are laminated together in such a manner that lead pins are electrically bonded by solder to the electrode portions of the silicon board through the electrode take-out portions of the insulating substrate. In this state, the low-melting glass is melted to bond the pressure sensing unit and the stem with each other.

12 Claims, 5 Drawing Sheets

SEMICONDUCTOR TYPE PRESSURE SENSOR

BACKGROUND OF THE INVENTION

1. Field of the Invention

The present invention relates to a semiconductor type pressure sensor and more particularly to a pressure sensor for the measurement of high-pressure liquids and gases.

2. Description of the Prior Art

As an example of the prior art relating to the present invention, mention is made of Japanese Patent Laid-Open No. 5-273063. The sensor disclosed in this unexamined publication mainly comprises, as shown in FIG. 1 thereof, a stem having through holes for the introduction of pressure, a glass substrate also having through holes and bonded to the stem by welding for example in a communicated state of its through holes with the through holes of the stem, and a pressure sensing silicon element bonded to the outer peripheries of the through holes by anode coupling for example. When pressure is introduced from the pressure introducing through holes, a diaphragm portion formed in the pressure sensing element is deformed, the resistance value of a strain gauge formed on the diaphragm changes, and an electric signal proportional to the pressure is outputted. However, this structure involves the problem that breakage is apt to occur due to, for example, peeling-off of the bonded portion upon application of a high pressure because tensile stresses are imposed on various portions under the application of pressure.

An example of a semiconductor type pressure sensor having a structure for high pressures is shown in Japanese Patent Laid Open No. 2-138776. In this semiconductor type pressure sensor, as illustrated in FIG. 1 thereof, a pressure sensing unit comprising a silicon chip and a glass substrate is disposed in a spatial portion of a cylindrical, metallic pressure introducing pipe formed in a housing, and the other portion thereof than diaphragm portion is hermetically sealed in the said pipe with a low-melting glass.

Thus, also in the structure of Japanese Patent Laid Open No. 2-138776, it is only a low-melting glass that is used for keeping the interior of the sensor in a hermetically sealed state against a medium to be measured. Therefore, in the event the low-melting glass is cracked under the application of a high pressure thereto, it is very likely that the medium to be measured will get into the sensor. This is very dangerous if the medium to be measured is a combustible substance such as, for example, gasoline.

The structure of the conventional pressure sensing unit involves a further problem such that in designing a diaphragm in consideration of pressure resistance and output characteristics, an optimum shape thereof differs depending on the pressure range to be measured and that therefore a pressure sensor designed for high pressure is difficult to ensure a high accuracy for a low pressure range.

SUMMARY OF THE INVENTION

The present invention has been accomplished in view of the above-mentioned problems and it is an object of the invention to provide inexpensively a pressure sensor superior in pressure resistance and capable of covering from low to high pressure range with a high accuracy.

A pressure sensing unit is constructed as follows. On a silicon board are formed an outer frame portion and a plurality of pressure sensing sections for high and low pressures, the pressure sensing sections each comprising a diaphragm portion, a strain gauge portion and an electrode portion. Next, the silicon board side with the strain gauge portions formed thereon and an insulating substrate having electrode take-out portions are bonded together in such a manner that the strain gauge portions are sealed hermetically and that the electrode portions on the silicon board and the electrode take-out portions on the insulating substrate are electrically connected together, to constitute a pressure sensing unit.

The surroundings of the pressure sensing unit are constructed as follows. Through holes are formed in a stem which fixes the pressure sensing unit and lead pins are inserted through the through holes in a hermetically sealed manner. Then, the pressure sensing unit, the low-melting glass and the stem are laminated together so that the lead pins are electrically connected by solder to the electrode portions on the silicon board through the electrode take-out portions of the insulating substrate. By subsequent melting of the low-melting glass, the pressure sensing unit and the stem are bonded together.

DETAILED DESCRIPTION OF THE PREFERRED EMBODIMENTS

Figure 1:
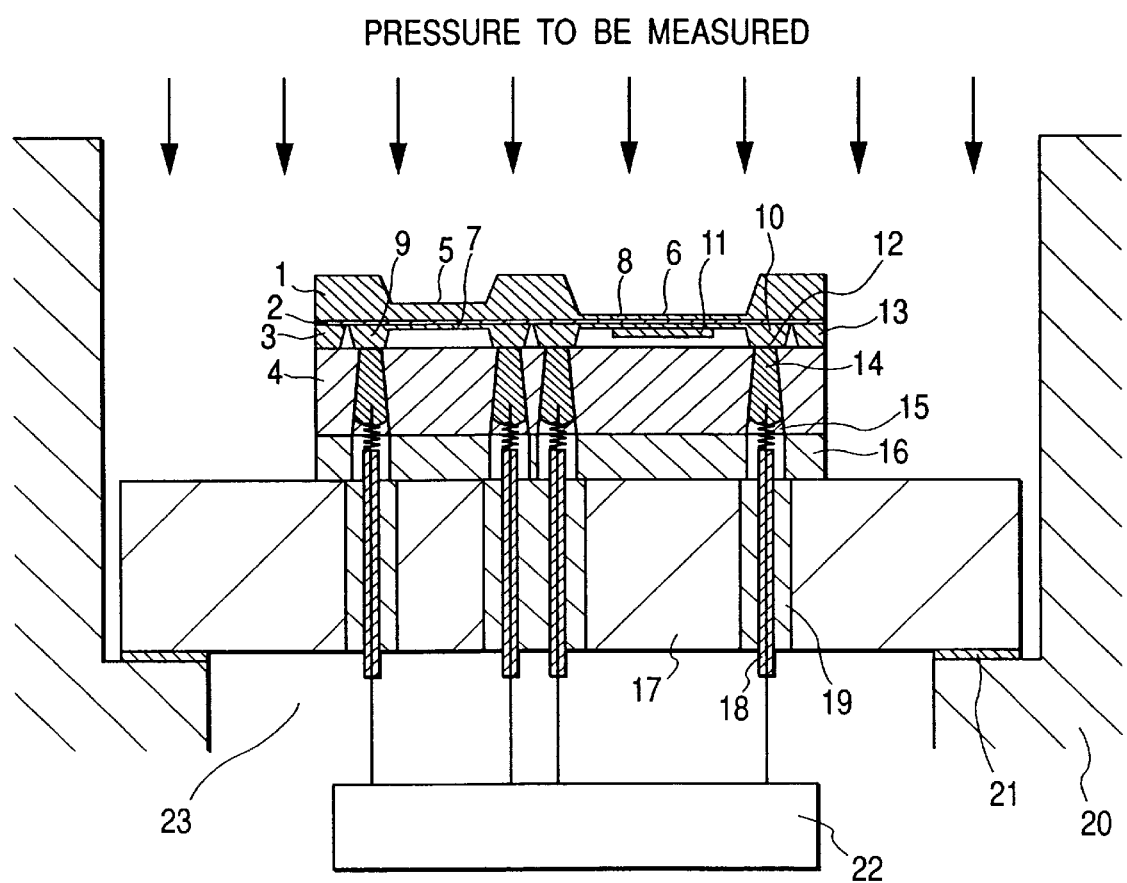
FIG. 1 is a diagram showing a mounting structure of a semiconductor type pressure sensor according to an embodiment of the present invention.
Figure 2:
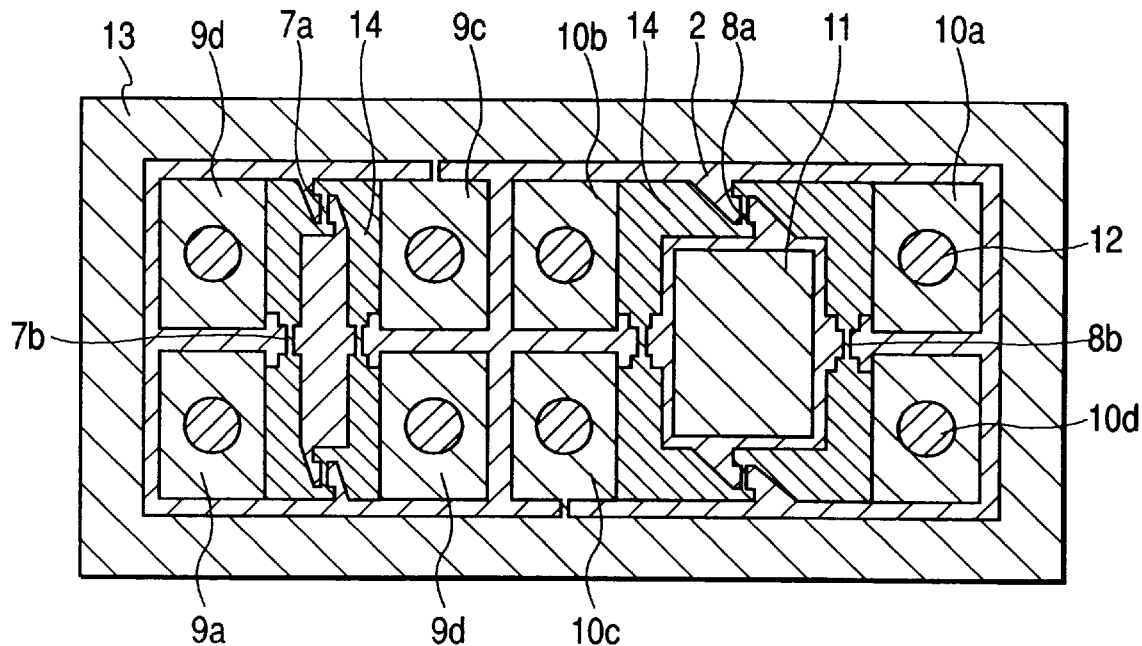
FIG. 2 is a diagram showing an example of a gauge structure used in the semiconductor type pressure sensor.

The present invention will be described in detail hereinunder by way of embodiments thereof illustrated in the drawings. FIG. 1 is a sectional view showing a semiconductor type pressure sensor according to an embodiment of the present invention and FIG. 2 is a plan view showing the structure of electrodes and that of gauges in detail. An SOI substrate comprising a first silicon board 1, a thermal oxide film 2 and a second silicon board 3 is bonded hermetically to a Pyrex glass substrate 4 by anode coupling. Two thin-walled portions for high and low pressures formed in the first silicon board 1 by etching constitute diaphragms 5 and 6 which are deformed under the application of pressure thereto. Strain gauges 7 and 8 are formed on the second silicon board at positions corresponding to the high- and low-pressure diaphragm portions 5, 6. Further, the low-pressure diaphragm portion 6 is provided with a flat plate-like projection (stopper) 11 for preventing the diaphragm from being deformed to excess and damaged when a high pressure is applied thereto. The SOI substrate and the Pyrex glass substrate 4 are bonded together at electrode portions 9, 10 and an outer frame portion 13, the electrode portions 9 and 10 being electrically connected to the strain gauges 7 and 8 and the outer frame portion 13 being electrically connected to the strain gauges 7 and 8 at the earth potential. The two strain gauges 7 and 8 for high and low pressures are hermetically sealed by the first silicon board 1 as a constituent of the SOI substrate, the outer frame portion 13 and the Pyrex glass substrate 4. Through holes 15 are formed in the Pyrex glass substrate 4. A multi-layered electroconductive film 12 (Al/Ti/Ni/Au) is formed on the electrode portions 9 and 10 of the SOI substrate exposed to the exterior and on the wall surface of each through hole 15 by, for example, sputtering, vapor deposition, or plating, and thereafter a Pb—Sn wiring portion 14 is sealed into each through hole 15 so as to be connected electrically to the said electroconductive film. Through holes are formed in a stem 17 which is formed using Kovar for example and eight lead pins 18 (four high-pressure pins and four low-pressure pins) are formed using a high-melting glass 19 hermetically through the said through holes. Through these lead pins the strain gauges 7 and 8 are electrically connected to an external signal processing circuit 22. A low-melting glass 16 is used for bonding the Pyrex glass substrate 4 and the stem 17 with each other. In this bonding, the tips of the lead pins projected from the stem 17 are inserted into the through holes 15, and when the low-melting glass 16 is melted under the conditions of 440° C., N2, 10 minutes, the wiring portions 14 also melt at the same time, whereby the lead pins 18 and. the electrode portions 9 and 10 are electrically connected together. In a housing 20 is formed a pressure introducing port which is in a concave shape, and the stem 17 is welded at a welded portion 21 to the bottom of the said pressure introducing port so that the pressure sensing unit comprising the SOI substrate and the Pyrex glass substrate 4 is directly exposed to a medium to be measured and so that the lead pin tips on the non-bonded side of the pressure sensing unit are positioned in an internal space 23 of the sensor not in contact with the medium to be measured. This structure is advantageous in point of pressure resistance because a compressive stress is imposed on each component and each bonded portion when pressure is applied. Even in the event of breakage of the low-melting glass 16 due to a high pressure, the medium to be measured does not leak to the internal space 23 of the sensor because the step 17 is present which is kept hermetic, and thus a double structure is ensured with respect to airtightness.

Reference will now be made to an approximate size of each component of the pressure sensing section. The thickness of an unetched portion of the first silicon board is about several hundred microns, the thickness of an etched portion thereof is about a hundred microns, the thickness of the thermal oxide film is about one micron, the thickness of the outer frame portion 13 of the second silicon board 3 and of the electrode portions 9, 10 is about 10 microns, the thickness of the thin-walled portion including the strain gauges 7 and 8 and the wiring portion is about several microns, the thickness of the Pyrex glass substrate 4 is about 1 mm, the diameter of each through hole 15 is about several hundred microns, the thickness of the low-melting glass 16 is about several hundred microns, the thickness of the stem 17 is about 2 mm, and a planar size of the entire pressure sensing section is about several millimeter square. In the figures which follow FIG. 1, the same components as in FIG. 1 are identified by the same reference numerals as in FIG. 1.

FIG. 2 is a plan view of the second silicon board of the SOI substrate as seen from the insulating substrate side. In the area surrounded with the outer frame portion 13, the left-hand side is a high pressure sensing section and the right-hand side is a low pressure sensing section. As mentioned previously, the stopper 11 is disposed centrally of the low pressure sensing section. In each of the pressure sensing sections are formed four electrodes which are VCC terminal 9a (10a), first output terminal 9b (10b), second output terminal 9d (10d) and GND terminal 9c (10c). The GND terminals 9c and 10c are connected to the outer frame portion 13. The upper portions of rectangular areas each surrounded by both outer frame portion 13 and four electrodes are made thin by etching the first silicon board 1. The said areas serve as diaphragm portions 5 and 6 which are displaced upon sensing a pressure. In the peripheral areas of the diaphragm portions 5 and 6 are disposed radial gauges 7a, 8a and tangential gauges 7b, 8b, which are formed each two by etching the second silicon board 3 bonded onto the thermal oxide film 2. The gauges 7a, 8a and 7b, 8b are electrically connected to the electrode portions 9 (9a, 9b, 9c, 9d) and 10 (10a, 10b, 10c, 10d) through the wiring portions 14 which are thin-walled and formed by etching the second silicon board 3. As the second silicon board 3 is used a single crystal silicon wafer of P type having a (100) plane and a specific resistivity of 0.01 to 1.0 Ω·cm. The strain gauges 7 and 8 are set at an electric resistance value of several hundred Ω to several kilo Ω. The wiring portions 14 other than the gauge portions are made small in electric resistance by sputtering of aluminum to form a thin metallic film or by implantation of boron. The portions indicated by the reference numeral 12 represent a multi-layered electroconductive film (Al/Ti/Ni/Au) formed on the electrode portions. The electroconductive film is formed by, for example, sputtering, vapor deposition, or plating, after the SOI substrate and the Pyrex glass substrate 4 have been bonded together.

Figure 3:
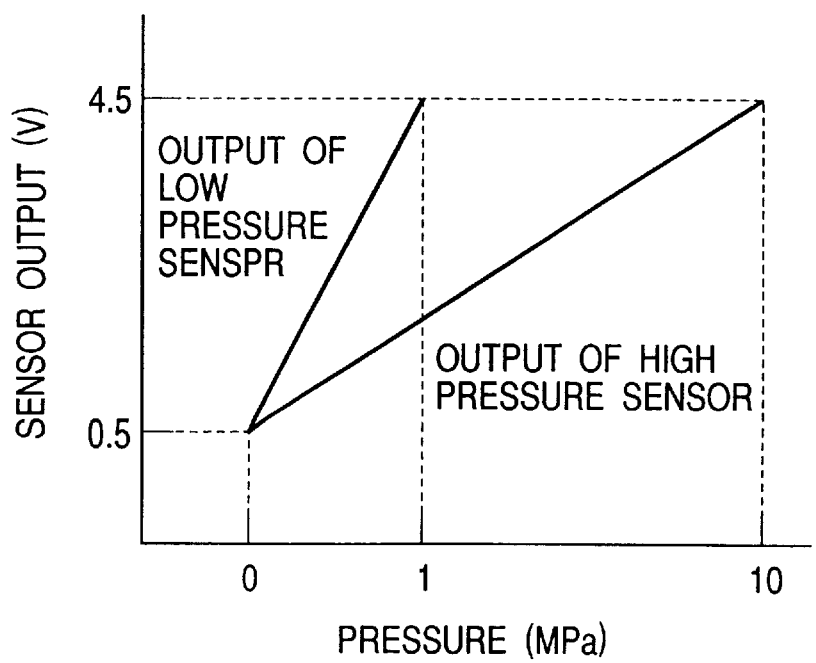
FIG. 3 is a diagram showing output characteristics of the semiconductor type pressure sensor.

Now, a description will be given briefly of operation principles. When the diaphragms deflect toward the Pyrex glass substrate 4 due to a pressure imposed thereon, the electric resistance values of the tangential gauges 7b and 8b increase, while those of the radial gauges 7a and 8a decrease. Therefore, as shown in FIG. 2, if the tangential gauges 7b (8b) and radial gauges 7a (8a) are electrically connected in a well-known bridge circuit and a constant voltage is applied between the electrode portion 9a (10a) and the electrode portion 9c (10c), a differential voltage proportional to the pressure to be measured is obtained between the electrode portion 9b (10b) and the electrode portion 9d (10d). In the case of the sensor being considered, a differential voltage of several ten millivolts is developed for an applied voltage of several volts, and by connecting the sensor to the signal processing circuit 22 which are electrically connected with the lead pins 18, there is obtained an output signal amplified to several volts. In this embodiment, both high and low pressure signals are outputted in parallel. FIG. 3 shows an example of output signals obtained when the low pressure measuring range is set at 0 to 1 Mpa and the high pressure measuring range at 0 to 10 Mpa. The sensitivity of output for pressure differs between the output for high pressure and the output for low pressure. Both outputs for high and low pressures increase linearly in accordance with applied pressures and reach the maximum voltage values at 1 Mpa and 10 Mpa, respectively. At 2 Mpa or so the stopper 11 of the low pressure-side diaphragm 6 comes into contact with the Pyrex glass substrate 4 to prevent breakage of the diaphragm 6 due to an excessive displacement thereof upon application of a high pressure thereto.

The amplification factor for high pressure output and that for low pressure output are to about the same degree, so by switching over between output values for high and low pressures it is possible to effect pressure measurement with a high accuracy from a low pressure region up to a high pressure region.

Figure 4:
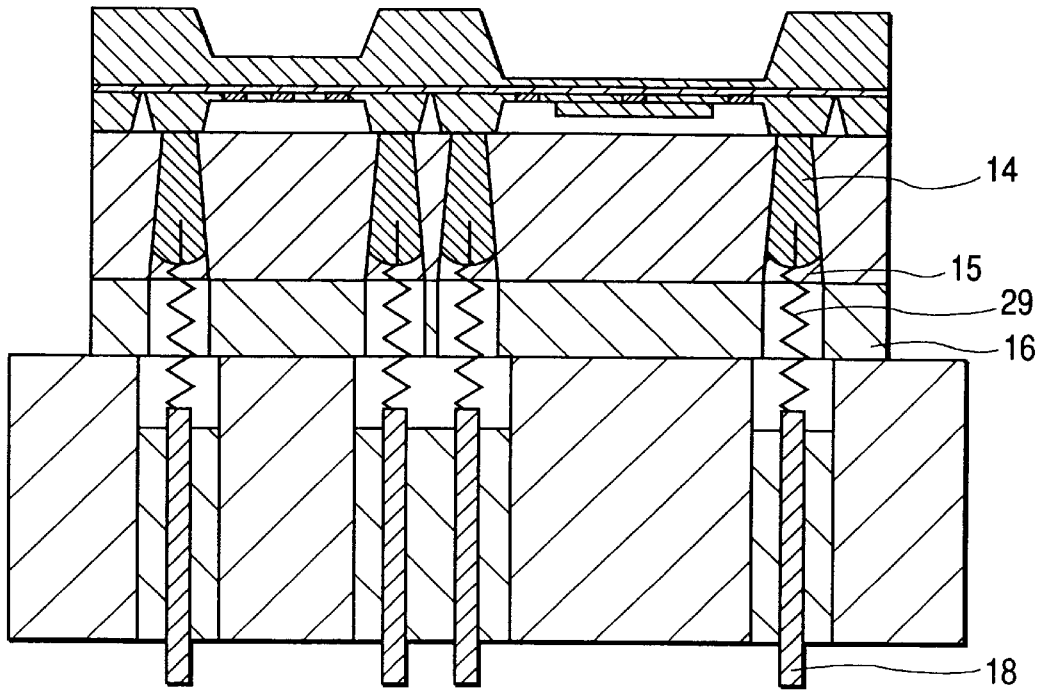
FIG. 4 is a diagram showing a mounting structure of a semiconductor type pressure sensor according to another embodiment of the present invention.

Now, a description will be given of another embodiment of the present invention with reference to FIG. 4, showing a modified mounting structure of a pressure sensing unit according to the present invention. This embodiment is different from the embodiment shown in FIG. 1 in that lead pins 18 are short on the bonded side with the low-melting glass 16 and that a spring 29 is mounted on the tip of each lead pin. In the previous embodiment the amount of ejection of the lead pins 18 and the tolerance of the through holes pose a problem in bonding, whereas in this embodiment the spring 29 improves the degree of the freedom of positioning in bonding because its degree of the freedom of shape is large. Further, also after bonding, the spring 29 serves as a stress buffer member, so it is advantageous also against a thermal stress or the like acting between each wiring portion 14 and the associated lead pin 18.

Figure 5:
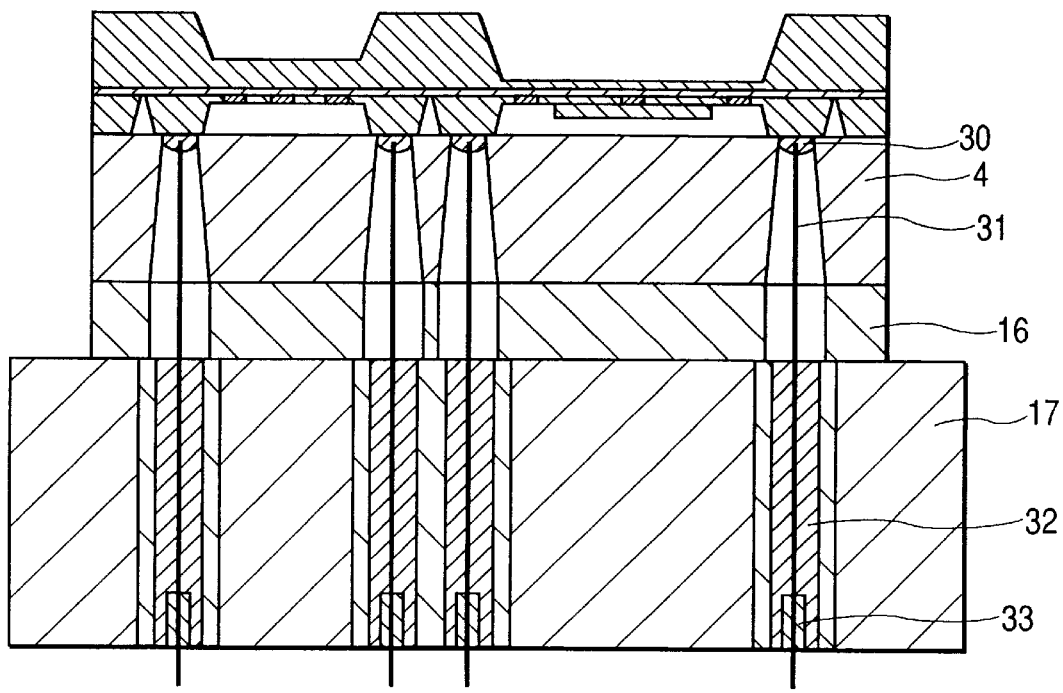
FIG. 5 is a diagram showing a mounting structure of a semiconductor type pressure sensor according to a further embodiment of the present invention.

Description is now directed to an embodiment using lead wires 31 instead of lead pins, with reference to FIG. 5.

Metallic guides 32 for lead wires 31 instead of lead pins are hermetically sealed in the stem. After the tips of the lead wires 31 and the electrode portions of the SOI substrate have been bonded by solder 30 (Pb—Sn solder or a eutectic bonding material such as Au—Sn or Au—Si), the pressure sensing unit, low-melting glass 16 and stem 17 are laminated together in such a manner that the lead wires 31 pass through the guide portions 32, and the low-melting glass 16 is melted to bond the Pyrex glass substrate 4 and the stem 17 with each other. Thereafter, the guide portions 32 and the lead wires 31 are hermetically sealed by welding. The lead wires 31 are fine and soft, so also in this embodiment, as is the case with the previous embodiment, it is easy to effect positioning at the time of bonding. Besides, since the lead wires 31 each act as a stress buffer member also after bonding, this is advantageous also against a thermal stress or the like.

Figure 6:
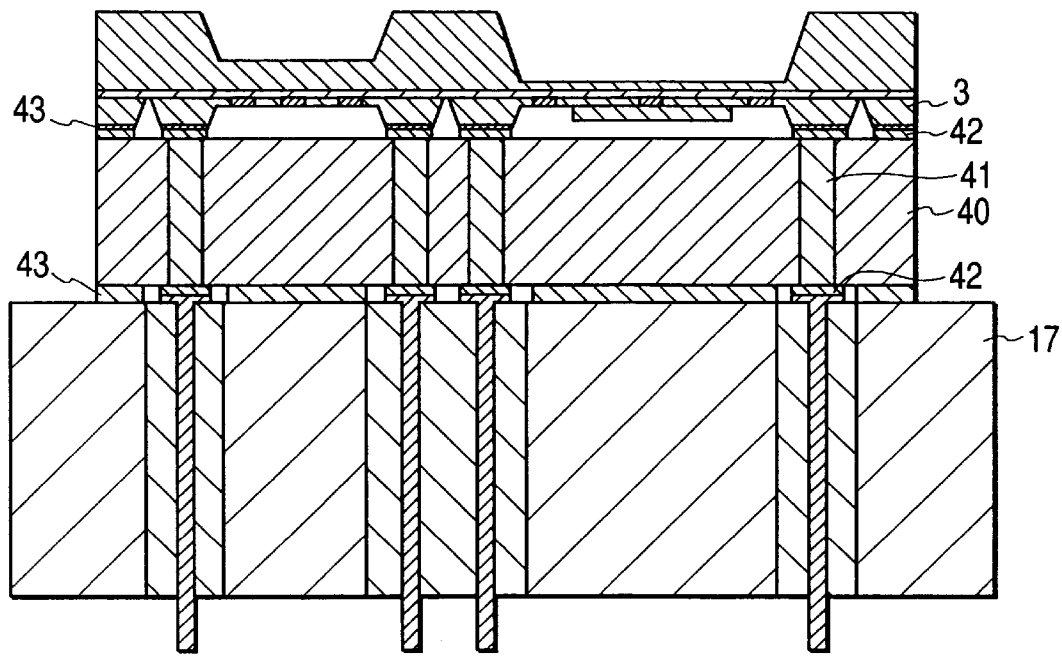
FIG. 6 is a diagram showing a mounting structure of a semiconductor type pressure sensor according to a still further embodiment of the present invention.

The following description is now provided about an embodiment which uses a mullite substrate in place of Pyrex glass as the substrate of the pressure sensing unit, with reference to FIG. 6. The mullite substrate, which is a ceramic substrate, is close to silicon in thermal expansion coefficient. Cylindrical tungsten conductors 41 are embedded in the mullite substrate 40. On both sides of the mullite substrate 40 metallic thin films 42 by sputtering for example in conformity with the shapes of the bonded surfaces of the second silicon board 3 and the stem 17. The mullite substrate 40 and the second silicon board 3, and the mullite substrate 40 and the stem 17, are respectively bonded together in a hermetically sealed state using a eutectic bonding material 43 such as Au—Sn or Au—Si. In this embodiment it is not necessary to bond electrode and lead pin in each through hole and therefore the working efficiency is improved.

Figure 7:
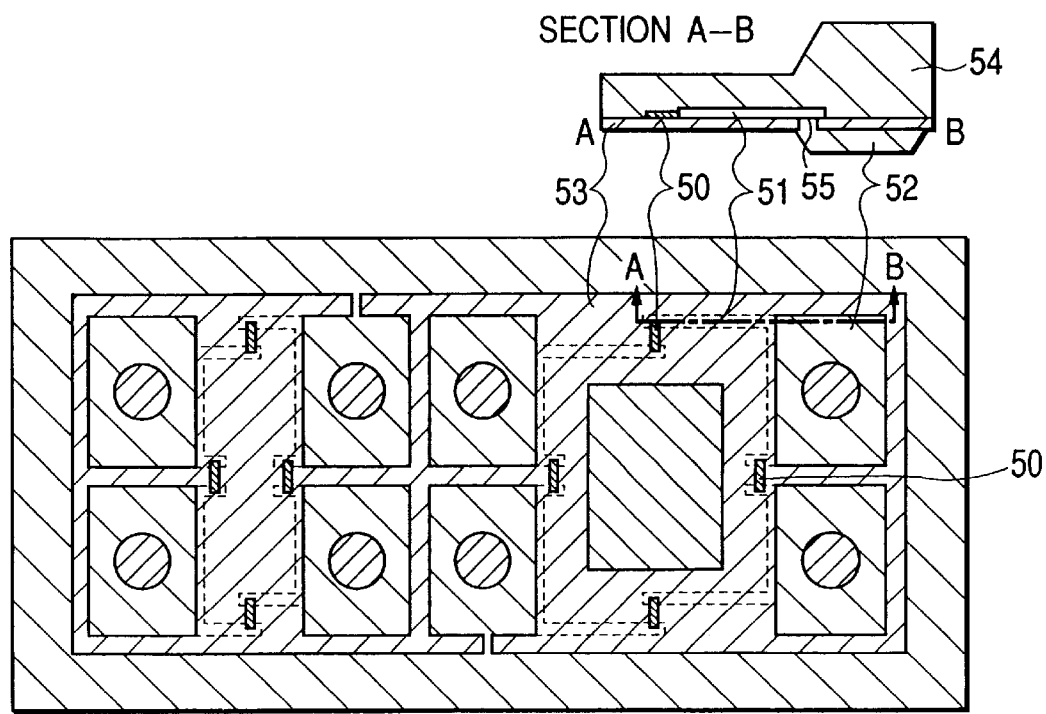
FIG. 7 is a diagram showing a gauge structure used in a semiconductor type pressure sensor according to a still further embodiment of the present invention.

Description is now directed to a further embodiment of the present invention with reference to FIG. 7 in which strain gauges are formed by impurity diffusion using a single silicon crystal substrate instead of SOI substrate. An n-type silicon substrate 54 is used as a base and on the left half side of the base are formed electrodes and strain gauges for high pressure, while on the right half side of the base are formed electrodes and strain gauges for low pressure, as well as a stopper. In accordance with a processing procedure for the silicon substrate there are performed formation of a surface oxide film, photoetching and impurity diffusion of boron for example to form low-resistance wiring portions 51 ($P^{++}$ layers) and gauge resistance portions 50 ($p^+$ layers), followed by the formation of an oxide film 53 and photoetching to form electrode take-out ports 55. Thereafter, a doped polycrystal silicon is formed throughout the whole surface by CVD for example and electrode portions 52, an outer frame portion 50 and a stopper 57 are formed by photoetching. In this embodiment the operation at a temperature as high as 150° C. or more is infeasible due to a leak current generated in the pn junction, but it is easy to integrate both amplifier circuit and pressure sensing sections into a single chip because the manufacture by IC processes is feasible.

Figure 8:
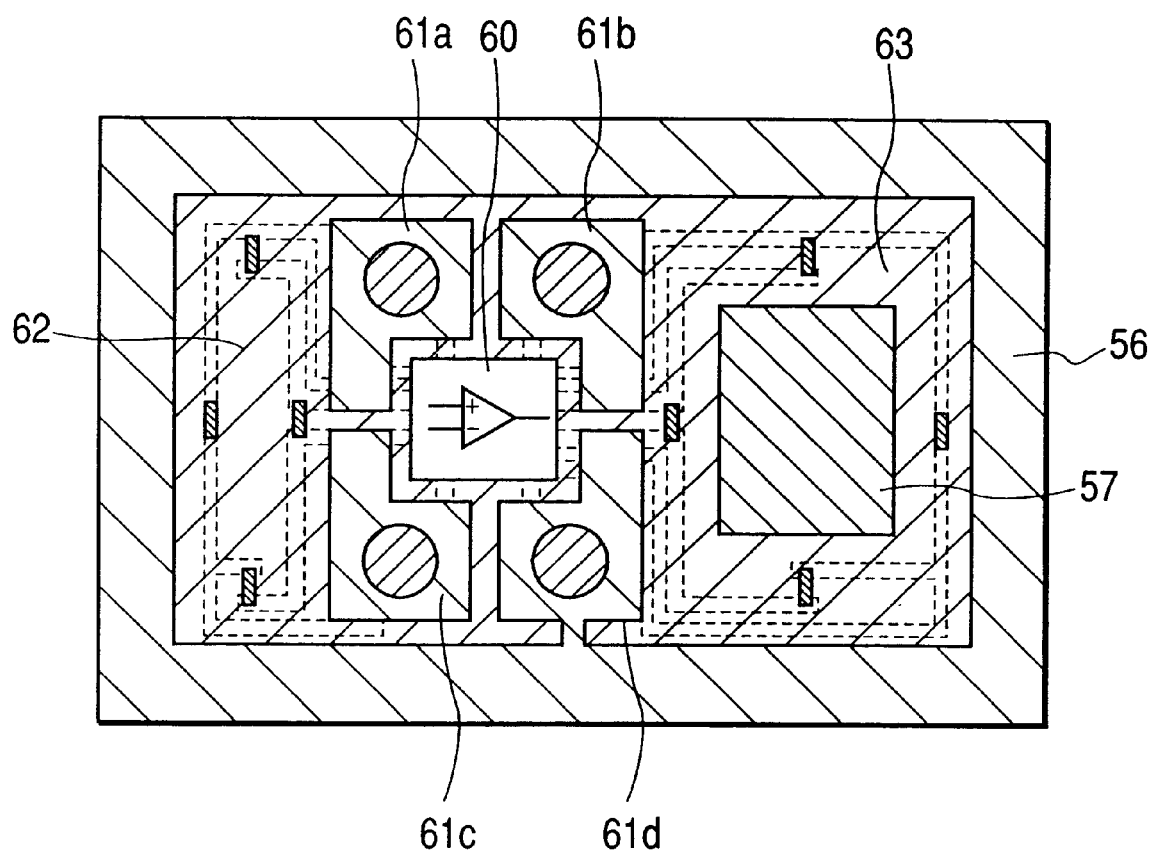
FIG. 8 is a diagram showing an example of an integrated configuration of a pressure sensing unit in a semiconductor type pressure sensor according to the present invention and a signal processing circuit.

Now, with reference to FIG. 8, a description will be given of an embodiment in which a signal processing circuit such as an amplifier circuit and pressure sensing sections are integrated into a single chip. Also in this embodiment, as is the case with the previous embodiment, an n-type silicon substrate is used as a base, and by conventional IC processes such as oxidation, diffusion, photoresist formation and vapor deposition there are formed a high pressure gauge portion 62 on the left-hand side, a low pressure gauge portion 63 on the right-hand side, and a signal processing circuit 60 centrally. Further, a doped polycrystal silicon is formed throughout the whole surface by CVD for example. Subsequently, four central electrodes (VCC terminal $61c$, GND terminal $61d$, high pressure output terminal $61a$ and low pressure output terminal $61b$), an outer frame portion 56 and a stopper 57 are formed by photoetching. By integrating both gauge portions and signal processing circuit into a single chip it is possible to greatly reduce the entire size of the sensor in comparison with the previous embodiment. It is also easy to integrate the signal processing circuit, as a single chip, into the semiconductor type pressure sensor constituted by the SOI substrate shown in FIG. 1.

According to these embodiments, the semiconductor type pressure sensor is of a structure which undergoes a compressive stress and which is a double seal structure comprising the pressure sensing unit and the hermetically sealed stem. Thus, it is possible to obtain a high-pressure sensor of high pressure resistance and high reliability. That is, it is possible to obtain a semiconductor type pressure sensor having no likelihood of outward leakage of a dangerous medium to be measured. Further, by integrating two independent high- and low-pressure sensing sections into a single chip it becomes possible to provide less expensively a semiconductor type pressure sensor capable of measuring pressures with a high accuracy not only in the high pressure region but also in the low pressure region.

What is claimed is:

1. A semiconductor type pressure sensor comprising:
   a silicon board formed with diaphragm portions, strain gauge portions and electrode portions;
   an insulating substrate formed on a side of the silicon board opposite to a location at which said diaphragm portions undergo pressure and provided with through holes;
   a stem arranged at a side of the insulating substrate opposite a side of the insulate substance facing the silicon board; and
   lead pins formed through the stem;
   said lead pins being electrically connected to the electrode portions of said silicon board through an electrically conductive material provided within the through holes of said insulating substrate, and said insulating substrate and said stem being bonded together in a hermetically sealed state.

2. A semiconductor type pressure sensor according to claim 1, wherein said silicon board has a high pressure sensing section and a low pressure sensing section.

3. A semiconductor type pressure sensor according to claim 2, wherein said silicon board is provided with a convex portion which comes into contact with said insulating substrate at a predetermined certain pressure or higher.

4. A semiconductor type pressure sensor comprising:

a silicon board formed with diaphragm portions, strain gauge portions and electrode portions;

an insulating substrate being arranged adjacent the silicon board and having through holes;

a stem arranged at a side of the insulating substrate opposite a side of the insulate substance facing the silicon board; and lead pins formed through the stem;

said lead pins being electrically connected to the electrode portions of said silicon board through an electrically conductive material provided within the through holes of said insulating substrate, and said insulating substrate and said stem being bonded together in a hermetically sealed state, wherein said silicon board is an SOI substrate constituted by a laminated three-layer structure of a first silicon substrate, a thermal oxide film and a second silicon substrate.

5. A semiconductor type pressure sensor according to claim 4, wherein said insulating substrate is a glass board or a ceramic board.

6. A semiconductor type pressure sensor according to claim 1, wherein said electrically conductive material provided within each of said through holes is Pb—An solder or a eutectic bonding material such as Au—Sn or Au—Si.

7. A semiconductor type pressure sensor according to claim 1, wherein a low-melting glass or a eutectic bonding material such as Au—Si is used for the bonding of said insulating substrate and said stem.

8. A semiconductor type pressure sensor according to claim 1, wherein a thin metallic film of plural layers is formed on the surfaces of the electrode portions of said silicon board located above the through holes of said insulating substrate, and Pb—Sn solder as an electrically conductive material is provided on said thin film.

9. A semiconductor type pressure sensor comprising:

a first pressure sensing section having a diaphragm and a strain gauge;

a second pressure sensing section having a diaphragm and a strain gauge, said second pressure sensing section being different in pressure sensitivity from said first pressure sensing section;

a single silicon substrate formed with both said first pressure sensing section and said second pressure sensing section;

an insulating substrate for hermetically sealing both said strain gauge in said first pressure sensing section and said strain gauge in said second pressure sensing section; and a signal processing circuit for processing output signals provided from both said strain gauge in said first pressure sensing section and said strain gauge in said second pressure sensing section.

10. A semiconductor type pressure sensor according to claim 9, wherein said first pressure sensing section is for measuring a low pressure and said second pressure sensing section is for measuring a high pressure.

11. A semiconductor type pressure sensor according to claim 9, further including a member for restricting the displacement of said diaphragm in said first pressure sensing section.

12. A semiconductor type pressure sensor according to claim 11, wherein said insulating substrate is disposed on the side opposite to the side where said diaphragms undergo pressures, and said strain gauges are electrically connected through through-holes formed in said insulating substrate to said signal processing circuit which is disposed in an external position.

* * * * *